United States Patent [19]

Desourdy

[11] Patent Number: 4,458,773
[45] Date of Patent: Jul. 10, 1984

[54] ENDLESS TRACK ASSEMBLY

[76] Inventor: Bernard Desourdy, 545 de Normandie St., Longueuil, Canada, J4H 3P6

[21] Appl. No.: 389,986

[22] Filed: Jun. 18, 1982

Related U.S. Application Data

[63] Continuation of Ser. No. 154,605, May 30, 1980, abandoned.

[51] Int. Cl.³ ............................................. B62D 55/10
[52] U.S. Cl. ........................................ 180/9.5; 305/21
[58] Field of Search .................. 180/9.52, 9.5; 305/29, 305/30, 31, 21

[56] References Cited

U.S. PATENT DOCUMENTS

| | | | |
|---|---|---|---|
| 1,336,981 | 4/1920 | Holt | 180/9.5 X |
| 1,407,963 | 2/1922 | Wickersham | 305/31 X |
| 1,442,568 | 1/1923 | Holt | 305/31 X |
| 1,592,654 | 7/1926 | Bremer | 180/9.52 |
| 2,374,240 | 4/1945 | Shankman | 180/9.1 |
| 2,981,350 | 4/1961 | Zouck et al. | 180/9.2 |
| 3,447,620 | 6/1969 | Schoonover | 180/9.52 |
| 3,447,621 | 6/1969 | Schoonover | 180/9.52 |
| 3,933,214 | 1/1976 | Guibord et al. | 180/9.2 R |
| 4,087,135 | 5/1978 | Unruh | 305/30 X |
| 4,279,318 | 7/1981 | Meisel, Jr. | 305/29 X |

FOREIGN PATENT DOCUMENTS 574850 4/1959 Canada .

Primary Examiner—Joseph Paul Brust

[57] ABSTRACT

An endless track assembly is disclosed to increase the ability of conventional tractors to travel over soft ground. The endless track assembly comprises a supporting frame detachably secured under the front of a conventional tractor body having driving wheels protruding from the sides of the body at the back of the latter, a first pair of endless track-mounting assemblies attached to the rear of such supporting frame, a support member secured to each track-mounting assembly and detachably secured under the rear of the tractor body, a second pair of endless track-mounting assemblies pivotally mounted to the front of the supporting frame and extending forwardly of the tractor body, idler wheels at the back and front and of said first and second pairs of endless track-mounting assemblies, hydraulic cylinder units mounted on the tractor for raising such second pair of endless track-mounting assemblies on the supporting frame and endless tracks trained on and surrounding the driving and idler wheels.

5 Claims, 7 Drawing Figures

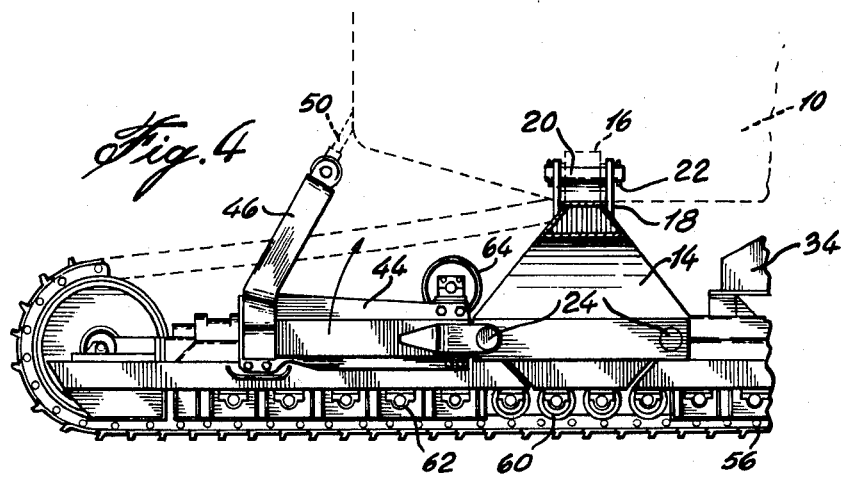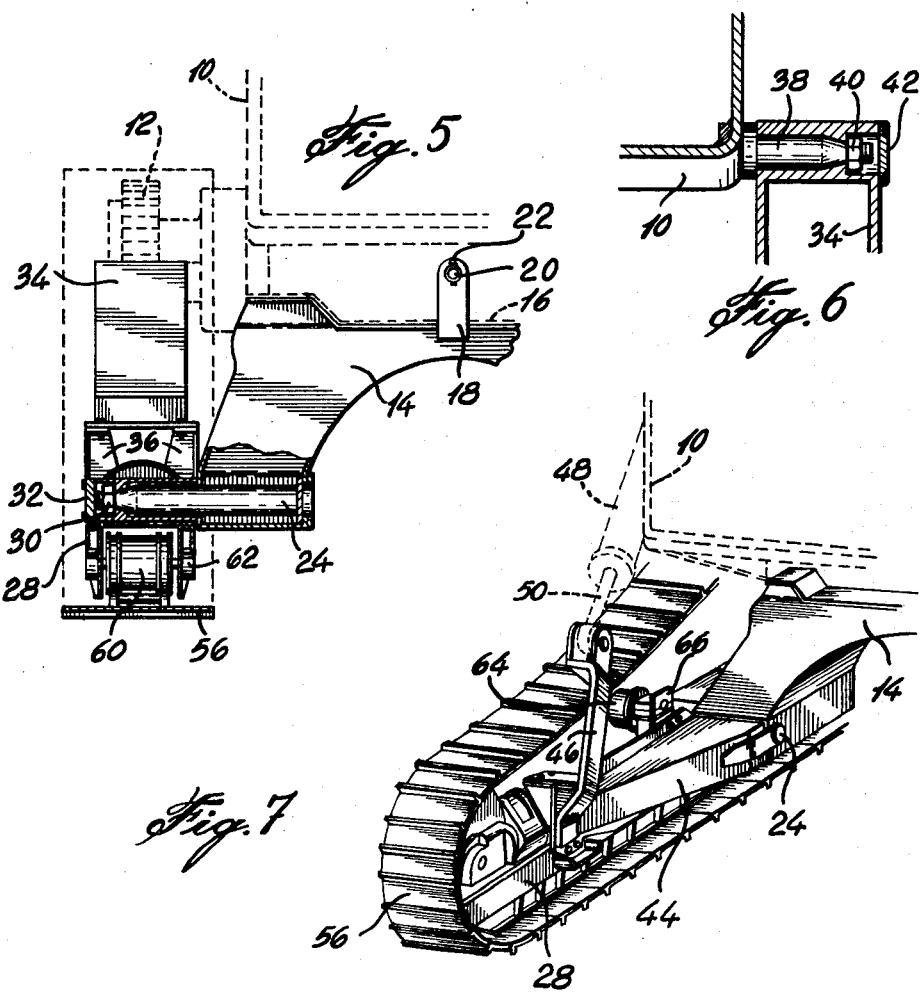

ENDLESS TRACK ASSEMBLY

The present application is a continuation application of application Ser. No. 154,605, filed May 30, 1980 now abandoned.

This invention relates to an endless track assembly for use on conventional tractors.

Tractors are normally equipped with an endless track assembly which is about the length of the tractor for operation on relatively hard grounds. Such regular endless track assembly does not generally provide enough support for operation of the tractor on soft grounds or in swamps.

It is therefore the object of the present invention to provide an endless track assembly which can be easily assembled on a regular tractor to increase its ground-engaging area and so permit the tractor to be used in soft grounds and swamps, and yet allow the tractor to run over any ground.

The endless track assembly in accordance with the invention comprises a supporting frame detachably secured to the front of the tractor, a first pair of endless track-mounting assemblies attached to the rear of such supporting frame, a support member secured to each track-mounting assembly and detachably secured to the rear of the body of the tractor, a second pair of endless track-mounting assemblies pivotally mounted to the front of the supporting frame, and means mounted on the tractor for pivoting the second pair of endless track-mounting assemblies on the supporting frame. Each track-mounting assembly includes an idler wheel rotatably mounted one at the back of each of the first pair of endless track-mounting assemblies, and the other at the front of each of the second pair of endless track-mounting assemblies, an endless track trained on and surrounding the driving and idler wheels one on each side of the tractor, and load-carrying wheels rotatably mounted on the first and second pairs of endless track-mounting assemblies for engaging the endless tracks.

In a preferred embodiment of the invention, the means for pivoting the second pair of endless track-mounting assemblies includes extensions pivotally mounted on the supporting frame, on each side of the tractor, and secured to each of the second pair of endless track-mounting assemblies, and two hydraulic cylinders mounted one on each side of the tractor and having their piston connected to such extensions.

The invention will now be disclosed, by way of example, with reference to the accompanying drawings, in which:

FIG. 4 illustrates a view taken along line 4—4 of FIG. 3;

FIG. 5 illustrates a view taken along line 5—5 of FIG. 1;

FIG. 6 illustrates a view taken along line 6—6 of FIG. 1; and

FIG. 7 illustrates a perspective view taken from the front of the track assembly shown in FIG. 1.

Figure 1:
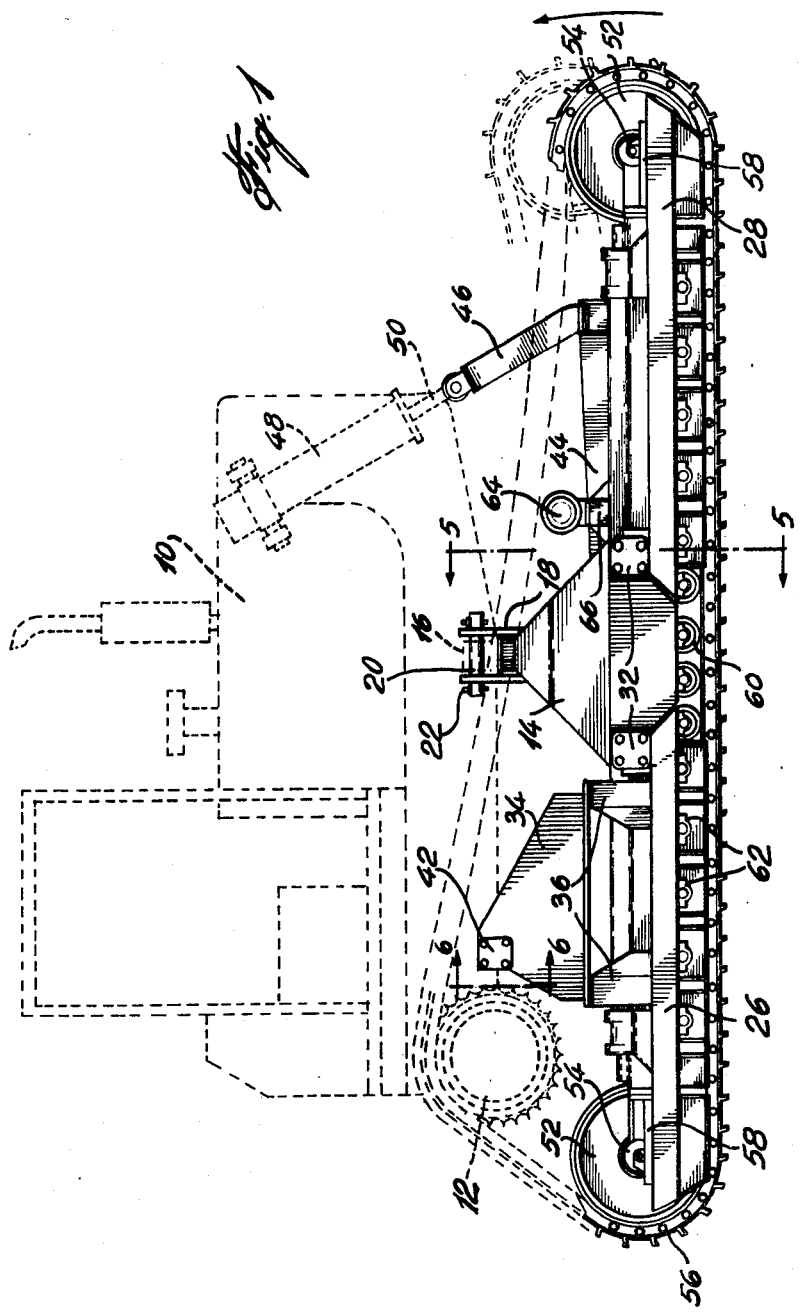
FIG. 1 illustrates a side view of a track assembly in accordance with the invention.

Referring to FIGS. 1 to 4 of the drawings, there is shown an endless track assembly which may be assembled on a conventional tractor 10 equipped with regular rear driving wheels 12 protruding from the sides of the tractor body. The endless track assembly comprises a supporting frame 14, which is removably attached to the regular front cross-beam 16 of the tractor by means of U-shaped cramps 18 and bolts 20 provided with locking pins 22. The supporting frame 14 is in the shape of an inverted U, as seen from the front or the back of the tractor (FIG. 2) and in the shape of an inverted V, as seen from the side of the tractor (FIGS. 1 and 4). The lower front and back ends of the legs of the supporting frame have apertures therein through which are inserted shafts 24, which extend through corresponding apertures in the near ends of two pairs of endless track-mounting assemblies 26 and 28, which are connected end to end. The track-mounting assemblies are secured to the shaft 24 by nuts 30 and the apertures in the track-mounting assemblies are closed by end plates 32.

A support member 34 is mounted on brackets 36 secured to each endless track-mounting assembly 26. As shown in FIG. 6 of the drawings, each support member 34 is secured to the tractor by means of shaft 38 and nut 40. The opening in the support member is closed by end plate 42. The rear endless track-mounting assemblies are thus rigidly secured to the tractor.

Figure 2:
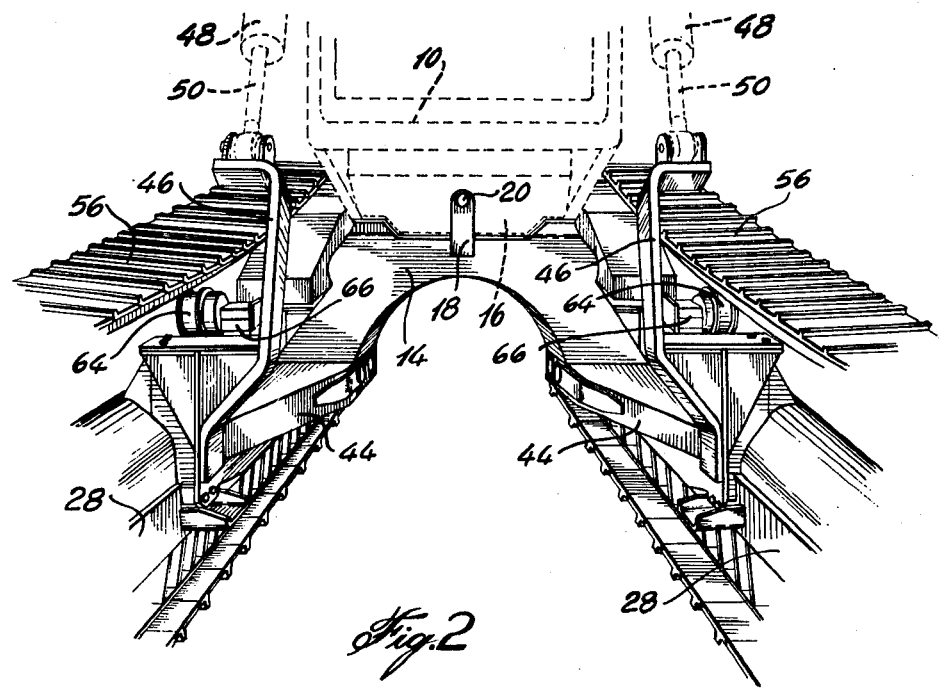
FIG. 2 illustrates a partial perspective view of the track assembly shown in FIG. 1.
Figure 3:
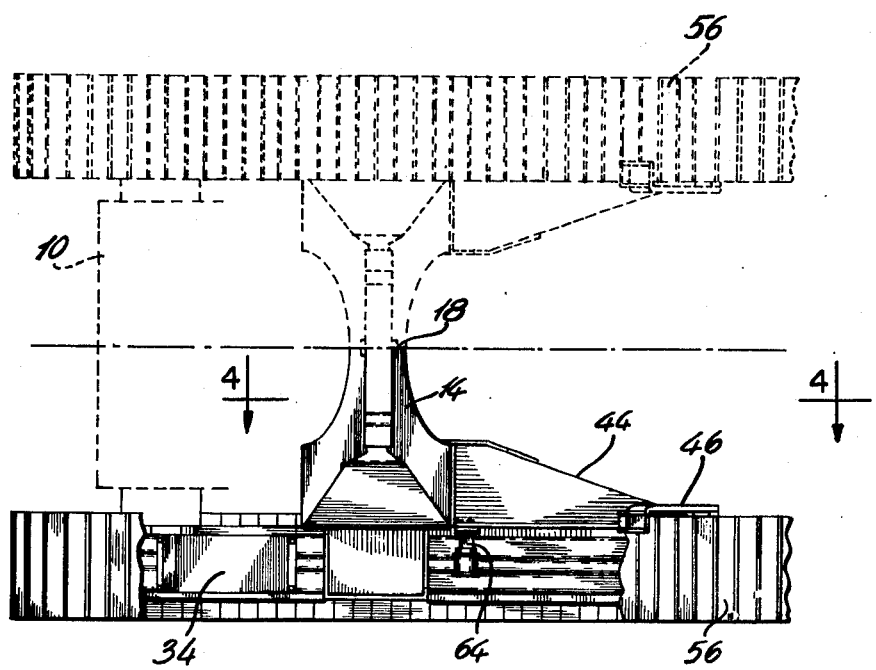
FIG. 3 illustrates a top view of the track assembly shown in FIG. 1.

As shown in FIGS. 2, 3, and 7, an extension 44 is rotatably mounted on each front shaft 24 and secured to each track-mounting assembly 28 on the inside of the latter, and a bracket 46 is secured to the front end of each extension 44. A pair of hydraulic cylinders 48, which form part of the regular equipment of the tractor, have their pistons 50 connected to the upper end of brackets 46 for raising or lowering the front endless track-mounting assembly 28.

Each endless track-mounting assembly includes an idler wheel 52 pivotally mounted on bearing blocks 54, which are located at the opposite ends of endless track-mounting assemblies 26 and 28, and a pair of tracks 56 are mounted around the driving wheel 12 and the idler wheels 52, one on each side of the tractor. The bearing blocks of the idler wheels are slidably mounted on guides 58 and operated by conventional mechanism (not shown) for tightening the tracks once installed on the wheels. Each track is supported between the two idler wheels 52 by means of conventional load-carrying wheels 60, which are journalled in bearing blocks 62 located underneath the endless track-mounting assemblies and underneath supporting frame 14. A roller 64 is also pivotally mounted on a bracket 66 secured to the top of endless track-mounting assemblies 28 for supporting the track when it becomes loose, such as when the front endless track-mounting assemblies 28 are raised.

Each idler wheel 52, driving wheel 12 and roller 14 are vertically aligned to engage the inside of the associated track 56. The portion of the latter extending from the front idler wheel 32 to the driving wheel 12 is progressively spaced from and above the pair of endless track-mounting assemblies 26 and 28 in the lowered position of front assemblies 28. When the latter are raised, the tractor rides on the rear assemblies 26, since its center of gravity is rearward of the load-carrying wheels 60 carried by supporting frame 14. In this condition, the tractor handles substantially like a tractor equipped with conventional tracks.

What I claim is:

1. An endless track assembly for a conventional tractor having a body with a rear end, a front end, sides and a bottom, and equipped with a pair of rear endless track-driving wheels located at said rear end and protruding from said sides and rotatable about a horizontal transverse rotational axis which is fixed relative to said tractor body, said assembly comprising:

(a) a supporting frame detachably secured to the front portion of said bottom and extending transversely of said tractor body underneath the latter;

(b) a pair of rear endless track-mounting assemblies attached at their front ends to the rear of said supporting frame and extending longitudinally of said tractor body externally of each side thereof, below the level of said bottom and vertically aligned with and below said rear driving wheels and projecting at their rear ends rearwardly from said rear driving wheels;

(c) a support member secured to, and upstanding from, the rear portion of each track-mounting assembly and detachably secured at its upper end to the rear portion of said tractor body;

(d) a pair of front endless track-mounting assemblies pivotally mounted at their rear ends to the front of said supporting frame about a transverse horizontal pivot axis for upward pivotal movement in vertical planes on each side of said tractor body from a lowered position in longitudinal alignment with the respective rear endless track-mounting assemblies, said pair of front endless track-mounting assemblies projecting at their front ends forwardly of the front end of said tractor body externally of each side thereof;

(e) power means mounted on the tractor body for pivoting the pair of front endless track-mounting assemblies on said supporting frame;

(f) a rear idler wheel rotatably mounted at the back of each rear endless track-mounting assembly and positioned below and rearwardly of the respective rear track-driving wheels;

(g) a front idler wheel rotatably mounted at the front end of each front endless track-mounting assembly;

(h) an endless track trained on and surrounding the driving and idler wheels, one on each side of tractor body, whereby said driving wheels as well as said idler wheels engage the inside of said endless tracks;

(i) load-carrying wheels engaging the inside of said endless tracks and rotatably mounted at the underside of said pairs of rear and front endless track-mounting assemblies for rotation about fixed rotational axes relative to said endless track-mounting assemblies, said load-carrying wheels lying in a common plane when said front endless track assemblies are in lowered position;

(j) the portion of each endless track extending from said front idler wheel to said driving wheel being progressively spaced from and above the associated pair of rear and front endless track-mounting assemblies when the latter is in lowered position; and (k) support means for supporting the upper run of said endless track between said front idler wheel and said rear driving wheel when said front track-mounting assembly is in raised position.

2. An endless track assembly as defined in claim 1, wherein said means for pivoting said pair of front endless track-mounting assemblies include an extension pivotally mounted on said supporting frame about said pivot axis, one on each side of the tractor body and secured to the inside of each of said pair of front endless track-mounting assemblies, and two hydraulic cylinder and piston units connected to the tractor body and to said extensions.

3. An endless track assembly as defined in claim 1 or 2, further comprising means mounted on said rear and front endless track-mounting assemblies and associated with their respective idler wheels of each track-mounting assembly for tightening the endless tracks.

4. An endless track assembly as defined in claim 1 or 2, wherein said support means is mounted on the rear top portion of the front endless track-mounting assemblies and consists of a bracket rotatively carrying a roller for supporting said upper run of the endless tracks to prevent it from engaging the top of said endless track-mounting assemblies when said upper run of the endless tracks is loosened during raising of the front endless track-mounting assemblies.

5. An endless track assembly as defined in claim 1 or 2, wherein said ends of said supporting frames are located between the front and rear ends of said rear and front endless track-mounting assemblies, respectively, and further including additional load-carrying wheels rotatably mounted at the underside of and intermediate said ends of said supporting frame and located intermediate said first-named load-carrying wheels for also engaging the inside of said tracks.

* * * * *